(12) United States Patent
Horiguchi et al.

(10) Patent No.: US 11,610,324 B2
(45) Date of Patent: Mar. 21, 2023

(54) THREE-DIMENSIONAL SHAPE MEASURING METHOD AND THREE-DIMENSIONAL SHAPE MEASURING DEVICE

(71) Applicant: Seiko Epson Corporation, Tokyo (JP)

(72) Inventors: Hirosada Horiguchi, Minowa (JP); Shuji Narimatsu, Hokuto (JP); Hiroshi Hasegawa, Chino (JP)

(73) Assignee: SEIKO EPSON CORPORATION

( * ) Notice: Subject to any disclaimer, the term of this patent is extended or adjusted under 35 U.S.C. 154(b) by 0 days.

(21) Appl. No.: 17/469,998

(22) Filed: Sep. 9, 2021

(65) Prior Publication Data
US 2022/0076435 A1 Mar. 10, 2022

(30) Foreign Application Priority Data
Sep. 10, 2020 (JP) .............................. JP2020-151912

(51) Int. Cl.
| | |
|---|---|
| G06T 7/521 | (2017.01) |
| G06T 7/60 | (2017.01) |
| G06T 7/62 | (2017.01) |
| G06T 7/586 | (2017.01) |
| G01B 11/25 | (2006.01) |
| G01B 11/06 | (2006.01) |
| G06K 9/62 | (2022.01) |

(52) U.S. Cl.
CPC .......... *G06T 7/521* (2017.01); *G01B 11/0608* (2013.01); *G01B 11/254* (2013.01); *G06K 9/6215* (2013.01); *G06T 7/586* (2017.01); *G06T 7/60* (2013.01); *G06T 2207/10024* (2013.01)

(58) Field of Classification Search
None
See application file for complete search history.

(56) References Cited

U.S. PATENT DOCUMENTS

| | | | |
|---|---|---|---|
| 2010/0195114 A1* | 8/2010 | Mitsumoto | G01B 11/2509 356/601 |
| 2013/0182897 A1* | 7/2013 | Holz | G06V 20/40 382/103 |
| 2018/0128602 A1 | 5/2018 | Morimoto et al. | |
| 2021/0195148 A1* | 6/2021 | Van Bommel | H04N 9/3164 |

FOREIGN PATENT DOCUMENTS

| | | |
|---|---|---|
| JP | 6590339 B2 | 10/2019 |
| WO | 2016/001985 A1 | 1/2016 |

* cited by examiner

*Primary Examiner* — Samuel D Fereja
(74) *Attorney, Agent, or Firm* — Harness, Dickey & Pierce, P.L.C.

(57) ABSTRACT

A three-dimensional shape measuring method includes: projecting a first grid pattern based on a first light and a second grid pattern based on a second light onto a target object in such a way that the first grid pattern and the second grid pattern intersect each other, the first light and the second light being lights of two colors included in three primary colors of light; picking up, by a three-color camera, an image of the first grid pattern and the second grid pattern projected on the target object, and acquiring a first picked-up image based on the first light and a second picked-up image based on the second light; and performing a phase analysis of a grid image with respect to at least one of the first picked-up image and the second picked-up image and calculating height information of the target object.

10 Claims, 13 Drawing Sheets

| | ABSOLUTE VALUE OF CORRELATION COEFFICIENT BETWEEN I(y) AND S(y) | | | | | | | | | | |
|---|---|---|---|---|---|---|---|---|---|---|---|
| y | $\phi=0$ | $\phi=0.5$ | $\phi=1.0$ | $\phi=1.5$ | $\phi=2.0$ | $\phi=2.5$ | $\phi=3.0$ | $\phi=3.5$ | $\phi=4.0$ | $\phi=4.5$ | MAXIMUM VALUE |
| 0 | 0.992 | 0.9678 | 0.8488 | 0.6467 | 0.3814 | 0.0787 | 0.2317 | 0.5195 | 0.7563 | 0.9192 | 0.992 |
| 1 | 0.9866 | 0.9703 | 0.859 | 0.6636 | 0.4032 | 0.1034 | 0.2066 | 0.4963 | 0.7375 | 0.9064 | 0.9866 |
| 2 | 0.9834 | 0.9762 | 0.8734 | 0.6851 | 0.4297 | 0.1323 | 0.1781 | 0.471 | 0.7179 | 0.8944 | 0.9834 |
| 3 | 0.9838 | 0.9768 | 0.8742 | 0.686 | 0.4307 | 0.1332 | 0.1773 | 0.4705 | 0.7176 | 0.8945 | 0.9838 |
| 4 | 0.9806 | 0.9756 | 0.8752 | 0.689 | 0.4355 | 0.1392 | 0.1706 | 0.4637 | 0.7115 | 0.8896 | 0.9806 |
| 5 | 0.9768 | 0.9788 | 0.8849 | 0.7044 | 0.4549 | 0.1609 | 0.1488 | 0.444 | 0.6957 | 0.8793 | 0.9788 |
| 6 | 0.9768 | 0.9818 | 0.8907 | 0.7124 | 0.4644 | 0.1709 | 0.1393 | 0.4359 | 0.6898 | 0.8762 | 0.9818 |
| 7 | 0.9756 | 0.9848 | 0.8977 | 0.7227 | 0.477 | 0.1846 | 0.1259 | 0.4241 | 0.6808 | 0.8708 | 0.9848 |
| 8 | 0.9763 | 0.985 | 0.8972 | 0.7217 | 0.4755 | 0.1828 | 0.1279 | 0.426 | 0.6824 | 0.872 | 0.985 |
| 9 | 0.974 | 0.9881 | 0.9055 | 0.7342 | 0.4911 | 0.1999 | 0.1109 | 0.4108 | 0.6705 | 0.8645 | 0.9881 |
| 10 | 0.9582 | 0.9902 | 0.9253 | 0.7698 | 0.539 | 0.2554 | 0.0532 | 0.3566 | 0.625 | 0.8323 | 0.9902 |
| 11 | 0.947 | 0.9899 | 0.9359 | 0.7903 | 0.5673 | 0.2889 | 0.0179 | 0.3229 | 0.5963 | 0.8113 | 0.9899 |
| 12 | 0.9411 | 0.9896 | 0.9413 | 0.8009 | 0.5821 | 0.3062 | 0.0004 | 0.3054 | 0.5813 | 0.8004 | 0.9896 |
| 13 | 0.9373 | 0.9856 | 0.9375 | 0.7976 | 0.5797 | 0.3049 | 0.0004 | 0.3042 | 0.579 | 0.7972 | 0.9856 |
| 14 | 0.9526 | 0.9711 | 0.8945 | 0.7304 | 0.4948 | 0.2107 | 0.0939 | 0.3894 | 0.6468 | 0.8408 | 0.9711 |
| 15 | 0.9473 | 0.9031 | 0.7705 | 0.5625 | 0.2994 | 0.007 | 0.2861 | 0.5511 | 0.7622 | 0.8988 | 0.9473 |
| 16 | 0.8667 | 0.7472 | 0.5545 | 0.3076 | 0.0305 | 0.2495 | 0.5051 | 0.7113 | 0.8478 | 0.9014 | 0.9014 |
| 17 | 0.6765 | 0.478 | 0.2328 | 0.0352 | 0.2998 | 0.535 | 0.7179 | 0.8305 | 0.8618 | 0.8087 | 0.8618 |
| 18 | 0.3805 | 0.1293 | 0.1346 | 0.3853 | 0.5983 | 0.7527 | 0.8334 | 0.8326 | 0.7502 | 0.5945 | 0.8334 |
| 19 | 0.0889 | 0.1879 | 0.4463 | 0.6611 | 0.8111 | 0.8818 | 0.8661 | 0.7656 | 0.5902 | 0.3571 | 0.8818 |
| 20 | 0.0164 | 0.2754 | 0.5403 | 0.7523 | 0.8907 | 0.9418 | 0.9008 | 0.7716 | 0.5669 | 0.3066 | 0.9418 |
| 21 | 0.0131 | 0.2634 | 0.514 | 0.7143 | 0.8447 | 0.8925 | 0.8528 | 0.7297 | 0.5351 | 0.2882 | 0.8925 |
| 22 | 0.1051 | 0.3781 | 0.6142 | 0.7901 | 0.8886 | 0.9002 | 0.8237 | 0.6665 | 0.4441 | 0.1782 | 0.9002 |
| 23 | 0.3539 | 0.5994 | 0.7863 | 0.8962 | 0.9184 | 0.8507 | 0.6997 | 0.4802 | 0.2137 | 0.0737 | 0.9184 |
| 24 | 0.6127 | 0.7996 | 0.9082 | 0.928 | 0.8569 | 0.7019 | 0.4782 | 0.2077 | 0.0831 | 0.3658 | 0.928 |
| 25 | 0.8014 | 0.9155 | 0.9399 | 0.8723 | 0.7193 | 0.496 | 0.224 | 0.0698 | 0.3568 | 0.6089 | 0.9399 |

THREE-DIMENSIONAL SHAPE MEASURING METHOD AND THREE-DIMENSIONAL SHAPE MEASURING DEVICE

The present application is based on, and claims priority from JP Application Serial Number 2020-151912, filed Sep. 10, 2020, the disclosure of which is hereby incorporated by reference herein in its entirety.

BACKGROUND

1. Technical Field

The present disclosure relates to a three-dimensional shape measuring method and a three-dimensional shape measuring device.

2. Related Art

As a method for measuring a three-dimensional shape of an object, a grid projection method using an optical technique is known.

WO2016/001985 discloses a measuring method for measuring a position of an object surface, based on a captured image acquired by a camera capturing a grid image of the object surface. This measuring method includes: a step of inputting a captured image captured by the camera in the state where one cycle of a grid in a grid image is made to correspond to N pixels; a step of extracting a plurality of successive pixels in the inputted captured image; a step of finding a phase of a frequency component having a cycle of N pixels from an image of the plurality of pixels that are extracted; and a step of finding a position of an object surface based on the phase. N is an integer greater than 2.

In this measuring method, the phase of the grid image is analyzed based on image data corresponding one cycle of the grid image and the three-dimensional shape of the object surface is thus measured. The method of analyzing the phase based on image data corresponding to one cycle of the grid image is particularly referred to as a "one-pitch phase analysis method (OPPA method)". The one-pitch phase analysis method enables high-speed analysis of a phase distribution based on one captured image.

In the measuring method in which the phase of the grid image is analyzed based on image data corresponding to one cycle of the grid image, as described in WO2016/001985, the measurement resolution is anisotropic. Specifically, in a direction parallel to the direction of the grid, the measurement resolution is equivalent to one pixel of the camera, whereas in a direction orthogonal to the direction of the grid image, the measurement resolution is as low as equivalent to one cycle of the grid image. Therefore, this measuring method has a problem in that the measurement accuracy may not be sufficient, depending on the shape of the object.

SUMMARY

A three-dimensional shape measuring method according to an application example of the present disclosure includes: projecting a first grid pattern based on a first light and a second grid pattern based on a second light onto a target object in such a way that the first grid pattern and the second grid pattern intersect each other, the first light and the second light being lights of two colors included in three primary colors of light; picking up, by a three-color camera, an image of the first grid pattern and the second grid pattern projected on the target object, and acquiring a first picked-up image based on the first light and a second picked-up image based on the second light; and performing a phase analysis of a grid image with respect to at least one of the first picked-up image and the second picked-up image and calculating height information of the target object.

A three-dimensional shape measuring device according to another application example of the present disclosure includes: a projector projecting a first grid pattern based on a first light and a second grid pattern based on a second light onto a target object in such a way that the first grid pattern and the second grid pattern intersect each other, the first light and the second light being lights of two colors included in three primary colors of light; a three-color camera picking up an image of the first grid pattern and the second grid pattern projected on the target object and acquiring a first picked-up image based on the first light and a second picked-up image based on the second light; and a computing unit performing a phase analysis of a grid image with respect to at least one of the first picked-up image and the second picked-up image and calculating height information of the target object.

BRIEF DESCRIPTION OF THE DRAWINGS

FIG. 12 explains a procedure for finding the correlativity between a luminance value data set acquired from a one-pitch grid and a plurality of sine waves generated with the phase shifted.

FIG. 13 is a table showing the absolute values of correlation coefficients between a luminance value data set DS for each camera pixel and a plurality of sine waves, calculated from the table shown in FIG. 12, and a maximum value thereof.

DESCRIPTION OF EXEMPLARY EMBODIMENTS

The three-dimensional shape measuring method and the three-dimensional shape measuring device according to the present disclosure will now be described in detail, based on embodiments shown in the accompanying drawings.

1. First Embodiment

First, a three-dimensional shape measuring method and a three-dimensional shape measuring device according to a first embodiment will be described.

1.1. Configuration of Device

Figure 1:
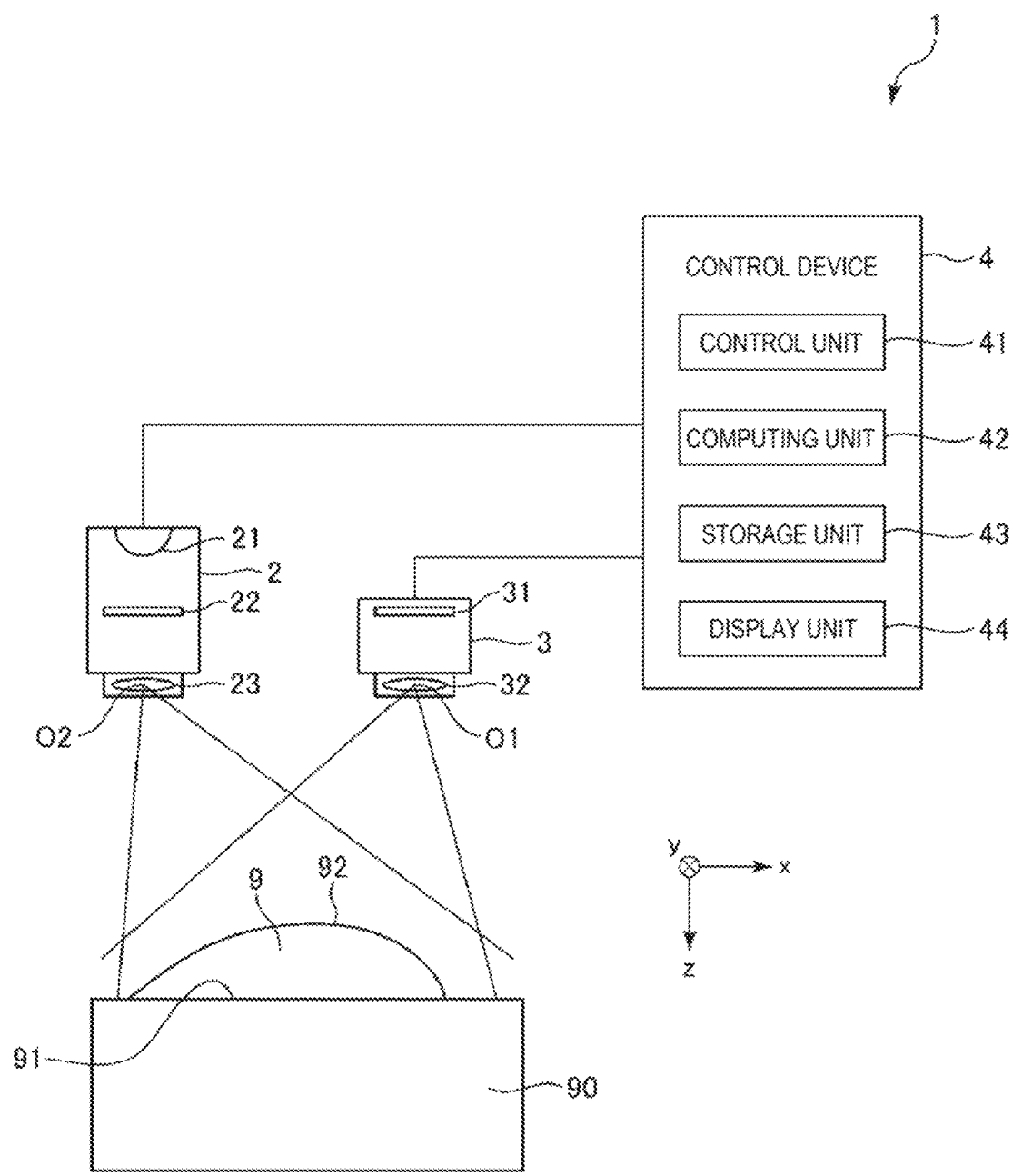
FIG. 1 is a schematic view of a three-dimensional shape measuring device according to a first embodiment.

FIG. 1 is a schematic view of the three-dimensional shape measuring device according to the first embodiment. In FIG. 1, an x-axis, a y-axis, and a z-axis are set as three axes orthogonal to each other. Each axis is represented by an arrow. The head side of the arrow is defined as "positive side". The base side is defined as "negative side". In the description below, the negative side on the z-axis is referred to as "up" and the positive side on the z-axis is referred to as "down". A position along the z-axis is referred to as "height". A position within an x-y plane is simply referred to as "position".

A three-dimensional shape measuring device 1 shown in FIG. 1 is a device that calculates the position and the height of a surface of an object 9 (target object) provided at a reference surface 91, that is, the position and the height of an object surface 92, and measures the three-dimensional shape thereof. A grid projection method is used to measure the three-dimensional shape. In the grid projection method, a grid pattern is projected onto the object 9 and an image of this state is picked up. Then, a phase analysis is performed on the picked-up image. By performing the phase analysis, the phase of the grid pattern at each pixel can be found. Then, height information is calculated from the phase. The three-dimensional shape of the object surface 92 is thus found.

The three-dimensional shape measuring device 1 shown in FIG. 1 has a projector 2, a camera 3, and a control device 4. Also, a mounting table 90 whose top surface is the reference surface 91, and the object 9 placed at the reference surface 91, are illustrated in FIG. 1.

The projector 2 has a function of emitting at least lights of two colors, of the three primary colors of light, red (R), green (G), and blue (B), and thus projecting a desired pattern. In this specification, the "color" refers to one of the three primary colors of light. In this specification, the three primary colors of light may be referred to as "RGB" according to need.

The projector 2 shown in FIG. 1 has a light source 21, a light modulation element 22 such as a liquid crystal display element, and a lens 23. The projector 2 shown in FIG. 1 is a simplified version of the actual structure. For example, in practice, the projector 2 may differ from the structure shown in FIG. 1 in that the light modulation element 22 is separated into a plurality of light modulation elements.

In the projector 2, the light modulation element 22 spatially modulates light emitted from the light source 21 and thus forms a grid pattern. This grid pattern is projected onto the object 9 via the lens 23. The projector 2 is electrically coupled to the control device 4. This enables the control device 4 to control the color, direction, pitch and the like of the grid pattern projected from the projector 2. In the description below, a pixel of the light modulation element 22 is also referred to as "projector pixel".

The camera 3 is a three-color camera having a function of detecting the luminance of the three primary colors of light at each pixel and acquiring a two-dimensional distribution of the resulting luminance value.

The camera 3 shown in FIG. 1 has an image pickup element 31 and a lens 32. The camera 3 shown in FIG. 1 is a simplified version of the actual structure. For example, in practice, the camera 3 may differ from the structure shown in FIG. 1 in that the image pickup element 31 is separated into a plurality of image pickup elements.

In the camera 3, the image pickup element 31 picks up, via the lens 32, an image of the grid pattern projected on the object 9. The camera 3 is electrically coupled to the control device 4. The picked-up image picked up by the camera 3 is transmitted to the control device 4 and is used for phase analysis. In the description below, a pixel of the image pickup element 31 is also referred to as "camera pixel".

The control device 4 has a control unit 41, a computing unit 42, a storage unit 43, and a display unit 44.

The control unit 41 controls operations such as the projection of a grid pattern by the projector 2 and the image pickup of the grid pattern by the camera 3 in such a way that these operations cooperate with each other.

The computing unit 42 performs a phase analysis on the picked-up image. The computing unit 42 thus finds the phase of the grid pattern at each camera pixel and calculates the three-dimensional shape of the object surface 92.

The storage unit 43 stores control data of the grid pattern projected by the projector 2, the picked-up image picked up by the camera 3, the result of the computation by the computing unit 42, and the like.

The display unit 44 is provided according to need and displays the picked-up image picked up by the camera 3, the result of the computation by the computing unit 42, and the like.

A part or the entirety of the control unit 41, the computing unit 42, and the storage unit 43 is formed of hardware having a processor processing information, a memory storing a program and data, and an external interface. The processor reads and executes various programs and data stored in the memory and thus implements each function.

The processor may be, for example, a CPU (central processing unit), a DSP (digital signal processor), or the like. The memory may be, for example, a volatile memory such as a RAM (random-access memory), a non-volatile memory such as a ROM (read-only memory), a removable external storage device, or the like. The external interface may be, for example, a wired LAN (local area network), a wireless LAN, or the like.

A part or the entirety of the control unit 41 and the computing unit 42 may be implemented by hardware such as an LSI (large-scale integration), an ASIC (application-specific integrated circuit), or an FPGA (field-programmable gate array).

In the three-dimensional shape measuring device 1 as described above, two grid patterns in different directions from each other are simultaneously projected onto the object 9, using lights of at least two colors, as will be described in detail later. Then, an image of the grid patterns projected on the object 9 is picked up and a phase analysis of the grid image is performed for each color. The three-dimensional shape of the object surface 92 is found, using the result of the analysis acquired from the picked-up image of at least one color.

An example of the phase analysis method for the grid image is the one-pitch phase analysis method. The principle of this method is described in WO2016/001985.

In the one-pitch phase analysis method, each of the optical system of the projector 2 and the optical system of the camera 3 is parallel to the reference surface 91. Such an optical system is also referred to as Moiré topography optical system. In such an optical system, on a picked-up image acquired by the camera 3 picking up an image of a grid pattern projected on the object 9, the cycle of the grid pattern is constant regardless of the height of the object surface 92. Meanwhile, the phase of the grid pattern at camera pixels changes depending on the height of the object surface 92. Therefore, the three-dimensional shape of the object surface 92 can be found by analyzing the coordinates of each camera pixel and the phase of the grid pattern at each camera pixel, using the one-pitch phase analysis method.

The phase analysis method like the one-pitch phase analysis method can perform a phase analysis based on a luminance distribution of one grid pitch in one picked-up image. Therefore, this phase analysis method is advantageous in that it can find a phase distribution even when the object 9 is moving. Meanwhile, in an analysis method that requires a plurality of picked-up images, for example, as in the phase shift method, it is difficult to perform accurate three-dimensional shape measurement on the moving object 9.

Figure 2:
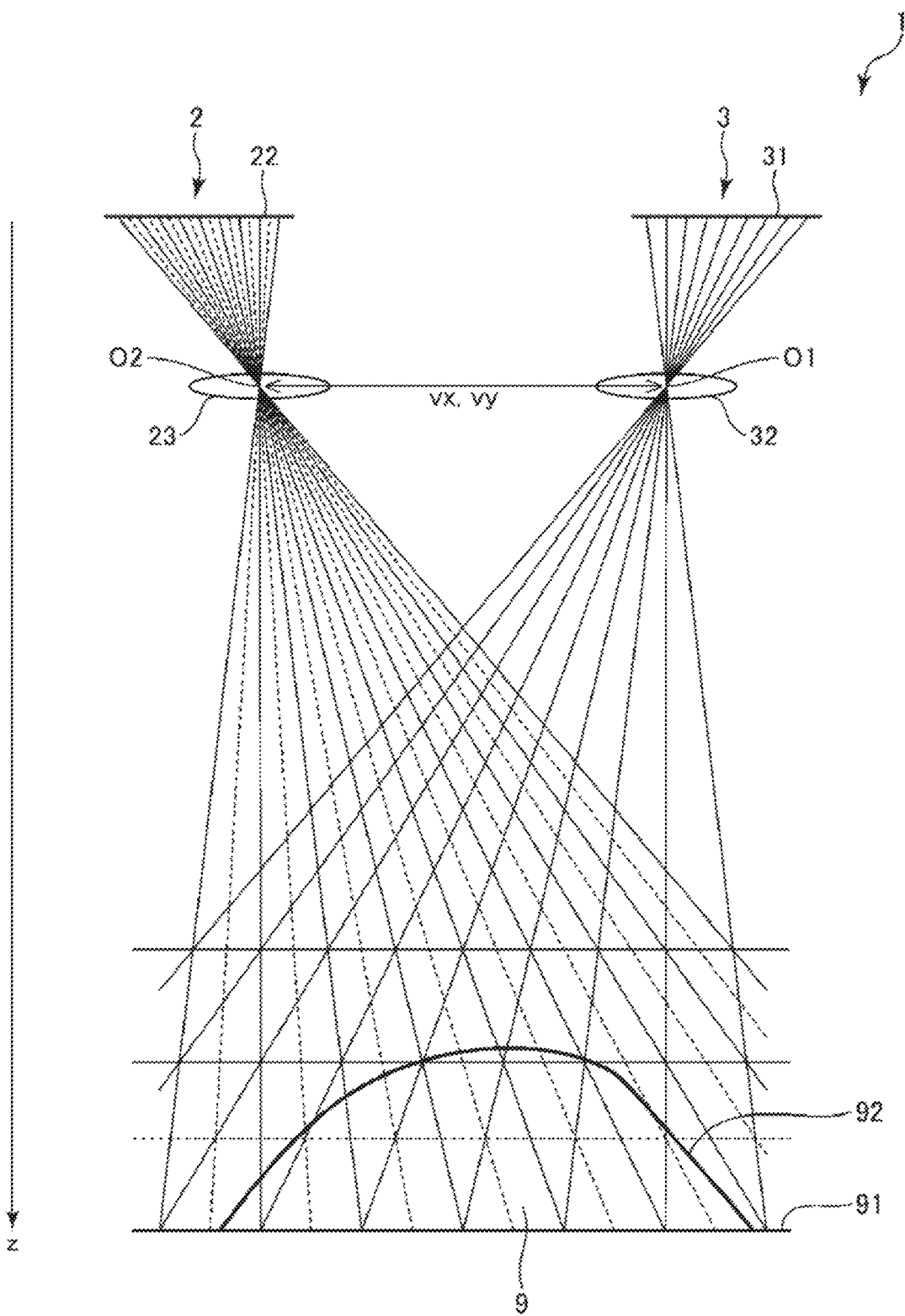
FIG. 2 is a side view schematically showing an optical system of the three-dimensional shape measuring device shown in FIG. 1.

FIG. 2 is a side view schematically showing the optical system of the three-dimensional shape measuring device 1 shown in FIG. 1.

As shown in FIG. 2, in the three-dimensional shape measuring device 1, a grid pattern is projected in such a way as to spread from the center of the lens 23 of the projector 2. Here, the center of the lens 23 is defined as a principal point O2 of the projector 2. Similarly, the image pickup range of the camera 3 is a range spreading from the center of the lens 32. Here, the center of the lens 32 is defined as a principal point O1 of the camera 3.

In FIG. 2, a grid pattern is schematically expressed by multiple straight lines. Of the straight lines expressing the grid pattern, a solid line represents, for example, the optical path of light projecting an area where the luminance of the grid pattern is high, and a dashed line represents the optical path of light projecting an area where the luminance of the grid pattern is low.

As can be seen from FIG. 2, in the optical system of the three-dimensional shape measuring device 1, one cycle of the grid pattern appears in the same size in the picked-up image by the camera 3 no matter what height the reference surface 91 or the object surface 92 is at. That is, the size of one cycle of the grid pattern in the picked-up image is defined by internal parameters of the projector 2 and the camera 3 and is not influenced by the distance to the reference surface 91 or the object surface 92. Therefore, this optical system enables the three-dimensional shape measurement on the object 9 regardless of the distance to the reference surface 91 or the object surface 92.

Figure 3:
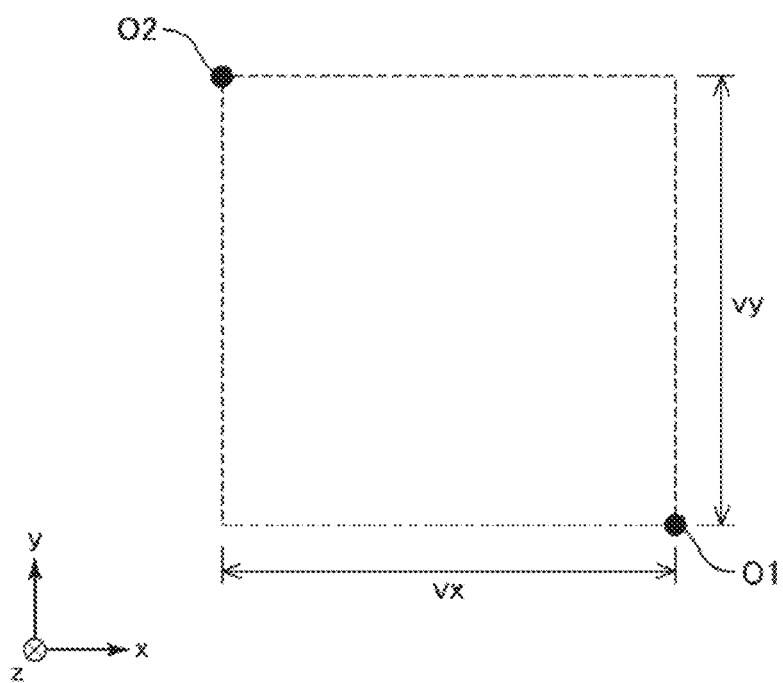
FIG. 3 is a top view schematically showing the optical system of the three-dimensional shape measuring device shown in FIG. 1.

FIG. 3 is a top view schematically showing the optical system of the three-dimensional shape measuring device 1 shown in FIG. 1.

As shown in FIG. 3, in the three-dimensional shape measuring device 1, as viewed from above, the principal point O2 of the projector 2 and the principal point O1 of the camera 3 are spaced apart from each other by a separation distance vx along the x-axis and a separation distance vy along the y-axis. Thus, even when two grid patterns in different directions from each other are simultaneously projected onto the object 9 and images of these grid patterns are picked up, as described above, the Moiré topography optical system shown in FIG. 2 can be formed both in the x-axis direction and in the y-axis direction. Consequently, the picked-up images of the two grid patterns are analyzed and the result of the analysis can be acquired simultaneously from the two picked-up images. Thus, even when the object 9 is moving, as described above, the result of the analysis acquired from the two picked-up images can be used and three-dimensional shape measurement can be performed at high speed and with high accuracy.

1.2. Measuring Method

The three-dimensional shape measuring method according to the first embodiment will now be described.

Figure 4:
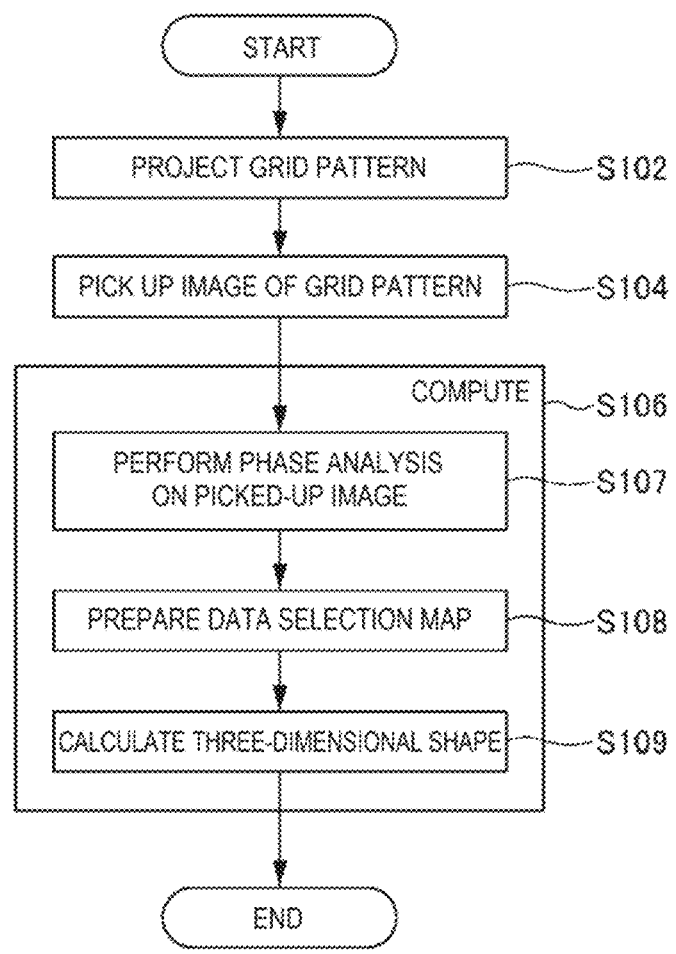
FIG. 4 is a flowchart for explaining a three-dimensional shape measuring method according to the first embodiment.

FIG. 4 is a flowchart for explaining the three-dimensional shape measuring method according to the first embodiment.

The three-dimensional shape measuring method shown in FIG. 4 includes a projection step S102, an image pickup step S104, and a computation step S106.

1.2.1. Projection Step

In the projection step S102, first, a grid pattern is prepared based on each of lights of two colors included in the three primary colors of light and is projected by the projector 2. In this specification, the lights of three colors included in the three primary colors of light are referred to as first light, second light, and third light.

Figure 5:
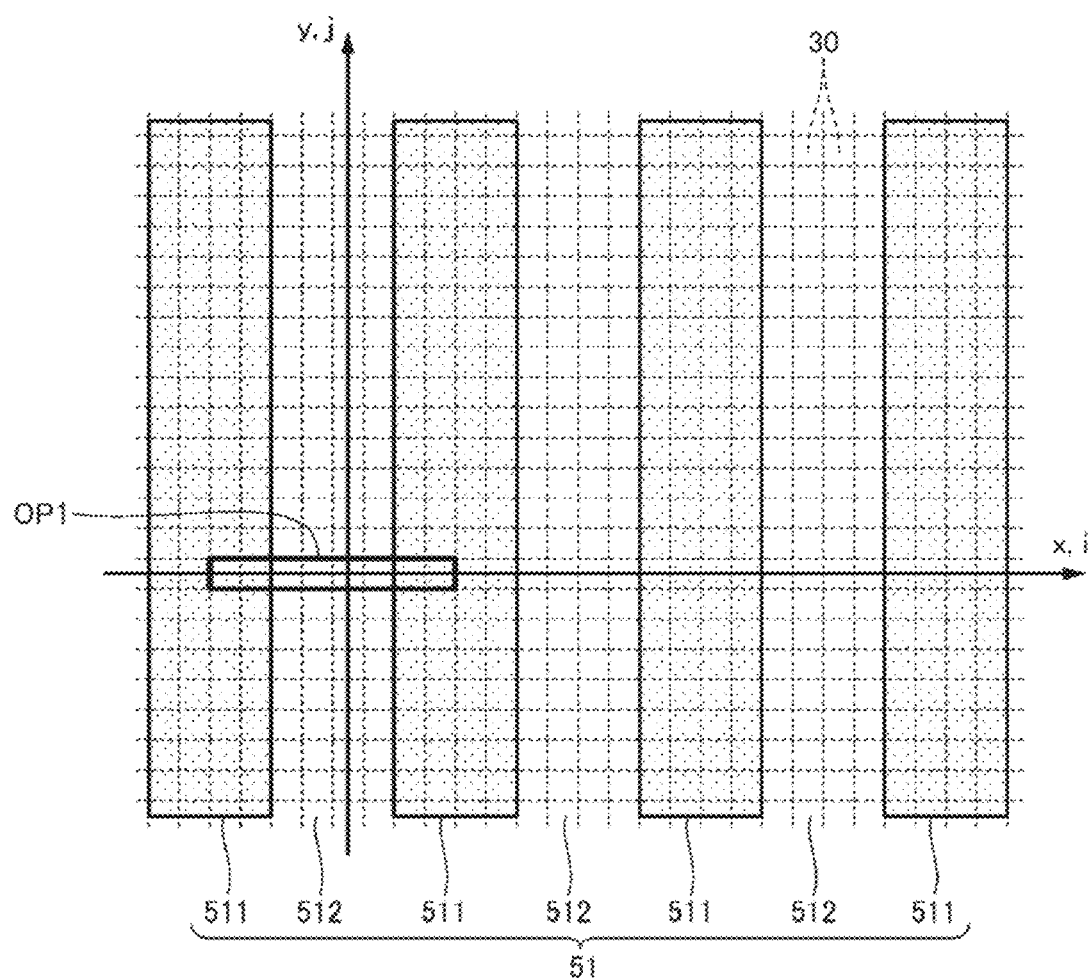
FIG. 5 shows a picked-up image acquired by picking up, by a camera, an image of a grid pattern projected by a projector, and separating a first light component.
Figure 6:
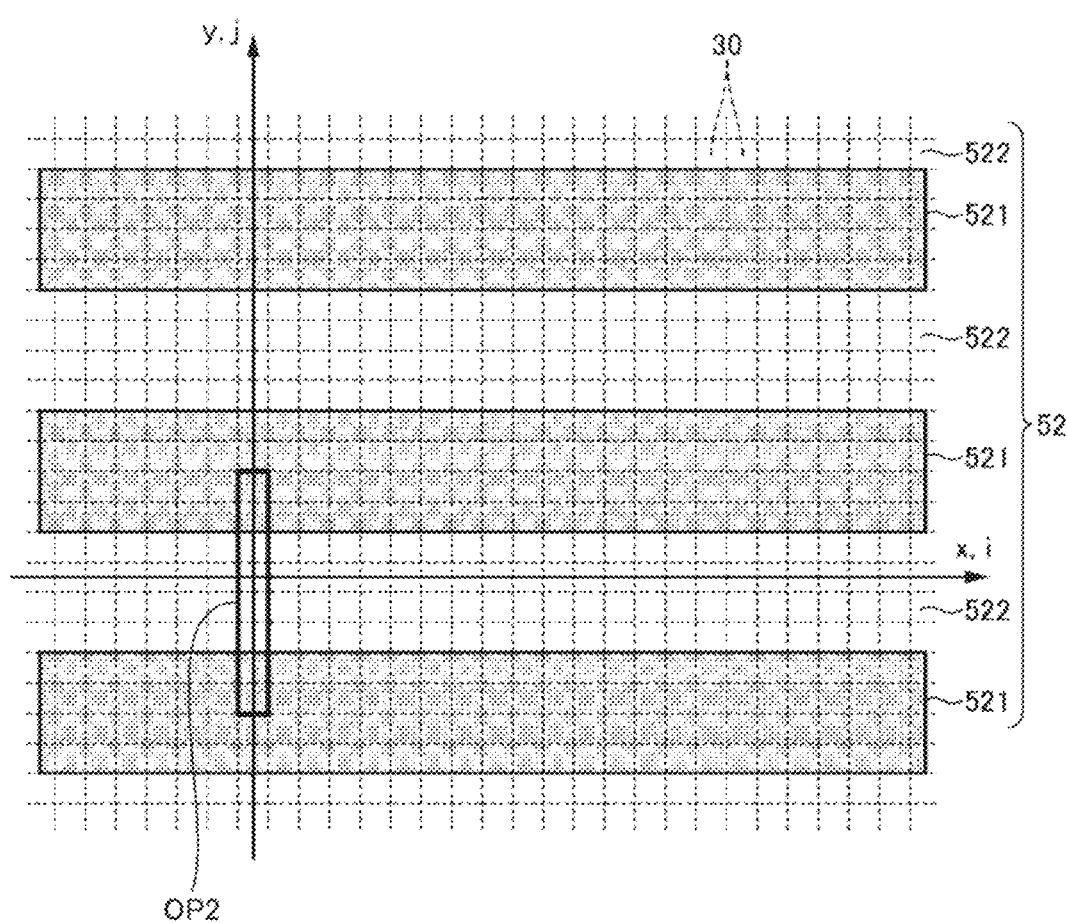
FIG. 6 shows a picked-up image acquired by picking up, by the camera, an image of the grid pattern projected by the projector, and separating a second light component.

FIG. 5 shows a picked-up image acquired by picking up, by the camera 3, an image of a grid pattern projected by the projector 2, and separating a first light component. FIG. 6 shows a picked-up image acquired by picking up, by the camera 3, an image of the grid pattern projected by the projector 2, and separating a second light component. FIGS. 5 and 6 also show arrows representing the x-axis and the y-axis defining directions of the grid pattern, and dashed lines representing boundaries between pixels of the camera 3. A quadrilateral surrounded by dashed lines corresponds to a camera pixel 30.

In FIGS. 5 and 6, the coordinates of the camera pixel 30 are (i, j). The optical system is set in such a way that the i-axis of the image pickup element 31 coincides with the x-axis prescribing a direction of the grid pattern and that the j-axis of the image pickup element 31 coincides with the y-axis prescribing a direction of the grid pattern.

In FIGS. 5 and 6, the grid pattern of a one-dimensional grid based on the first light is referred to as "first grid pattern 51" and the grid pattern of a one-dimensional grid based on the second light is referred to as "second grid pattern 52".

The first grid pattern 51 is a one-dimensional grid extending along the y-axis. Specifically, the first grid pattern 51 has a plurality of strip-like areas 511 irradiated with the first light with a relatively low luminance. The strip-like areas 511 extend parallel to the y-axis and are arranged at constant intervals along the x-axis. The first grid pattern 51 also has a plurality of strip-like areas 512 located between the areas 511 and irradiated with the first light with a relatively high luminance. The width of strip-like areas 511 and the width of the strip-like areas 512 are the same as each other.

The second grid pattern 52 is a one-dimensional grid extending along the x-axis. Specifically, the second grid pattern 52 has a plurality of strip-like areas 521 irradiated with the second light with a relatively low luminance. The strip-like areas 521 extend parallel to the x-axis and are arranged at constant intervals along the y-axis. The second grid pattern 52 also has a plurality of strip-like areas 522 located between the areas 521 and irradiated with the second light with a relatively high luminance. The width of strip-like areas 521 and the width of the strip-like areas 522 are the same as each other.

The grid pitch of the first grid pattern 51 and the grid pitch of the second grid pattern 52 may be different from each other but may preferably be the same. When the grid pitches are the same, the dynamic ranges of measurement based on the two patterns are the same and this makes it easier to perform measurement and handle the result of the measurement.

Meanwhile, the number of projector pixels corresponding to one cycle of the grid pattern is not particularly limited. That is, the number of projector pixels corresponding to the width of the areas 511, 512, 521, 522 may be one, or two or more.

In this embodiment, the direction of the first grid pattern 51 and the direction of the second grid pattern 52 are orthogonal to each other. However, the effect of the embodiment can be achieved when these directions intersect each other, if not orthogonal to each other.

In this embodiment, the x-axis of the grid pattern and the i-axis of the image pickup element 31 correspond to each other and the y-axis of the grid pattern and the j-axis of the image pickup element 31 correspond to each other, as described above. However, the direction of arrangement of projector pixels of the projector 2 may be inclined to the x-axis and the y-axis.

Figure 7:
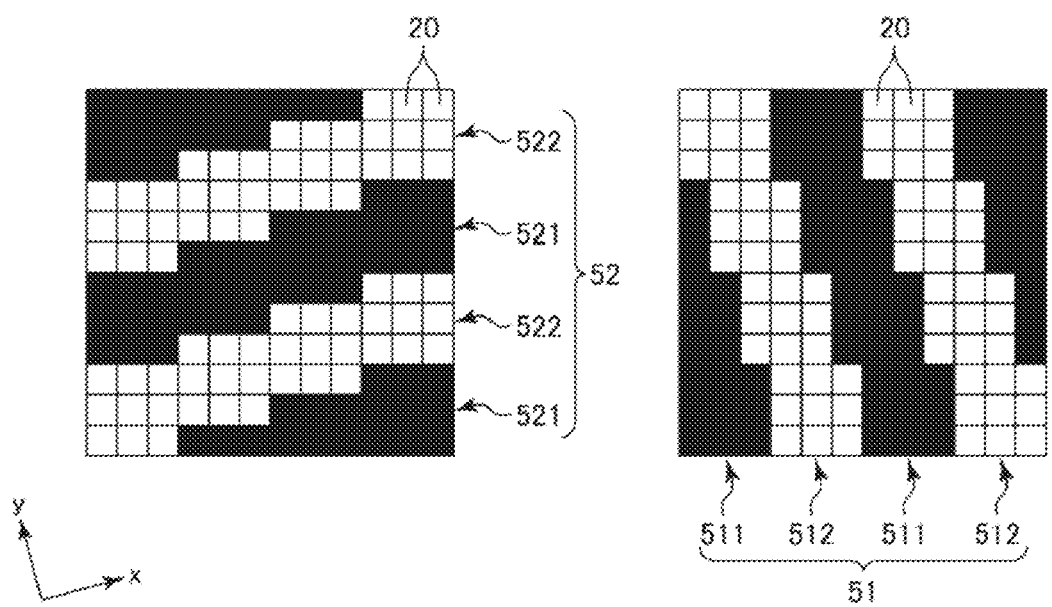
FIG. 7 is a schematic view showing a first grid pattern and a second grid pattern when the direction of arrangement of projector pixels is inclined to an x-axis and a y-axis.

FIG. 7 is a schematic view showing the first grid pattern 51 and the second grid pattern 52 when the direction of arrangement of projector pixels 20 is inclined to the x-axis and the y-axis.

In FIG. 7, the direction of arrangement of the projector pixels 20 is inclined to the first grid pattern 51 and the second grid pattern 52. In other words, the x-axis and the y-axis are inclined to the direction of arrangement of the projector 2.

In this case, too, the first grid pattern 51 and the second grid pattern 52 are prepared and projected in such a way as to be inclined to the direction of arrangement of the projector pixels 20. This enables the x-axis of the grid pattern and the i-axis of the image pickup element 31 to correspond to each other and enables the y-axis of the grid pattern and the j-axis of the image pickup element 31 to correspond to each other, as described above. Thus, the effect of the embodiment can be achieved.

Next, a range corresponding to one cycle of the grid pattern that is a target of phase analysis will be described.

In this embodiment, the optical system formed by the projector 2 and the camera 3 is set in such a way that one cycle of the grid pattern appears on N successive pixels of the camera pixels 30. N is an integer equal to or greater than 3.

In the example shown in FIGS. 5 and 6, the first grid pattern 51 has a cycle with a length corresponding to eight successive camera pixels 30 along the x-axis, and the second grid pattern 52 has a cycle with a length corresponding to eight successive camera pixels 30 along the y-axis. Therefore, in the example shown in FIGS. 5 and 6, the optical system is set in such a way that eight camera pixels 30 coincide with one cycle of the first grid pattern 51. Also, in the example shown in FIGS. 5 and 6, the optical system is set in such a way that eight camera pixels 30 coincide with one cycle of the second grid pattern 52. In this way, in the three-dimensional shape measuring device 1, the optical system is set in such a way that one cycle of the grid pattern projected by the projector 2 has a length corresponding to an integral multiple of the camera pixel 30.

The first light and the second light are lights of at least two colors of RGB, as descried above. In the projection step S102, these lights are simultaneously cast and the first grid pattern 51 and the second grid pattern 52 are thus projected simultaneously.

The first light and the second light are lights of two colors of the three primary colors of light. Therefore, even when these lights are cast as superimposed on each other, the camera 3, which is a three-color camera, can separate these lights. This enables high-speed measurement using lights of two colors.

For such reasons, the projector 2 may preferably be a three-color separation projector. The three-color separation projector can separately emit lights of three colors at all the projector pixels and therefore has the function of simultaneously projecting the first grid pattern 51 based on the first light and the second grid pattern 52 based on the second light. Thus, when the camera 3 simultaneously acquires a picked-up image based on the first light and a picked-up image based on the second light and the control device 4 analyzes the two picked-up images, separate information can be acquired from the two picked-up images.

As the three-color separation projector, particularly a three-panel projector may be preferably used. The three-panel projector has three light modulation elements corresponding to lights of three colors, respectively. Therefore, the lights of three colors can be separately modulated at all the projector pixels and can be cast with high position accuracy.

Specifically, as the three-panel projector, for example, a transmission-type 3LCD system, a reflection-type 3LCD system, a three-chip DLP system or the like may be employed. The transmission-type 3LCD system uses three transmission-type LCD elements. The reflection-type 3LCD system uses three reflection-type LCD elements. LCD refers to liquid crystal display. The three-chip DLP system uses an optical system that can scan with three lights separately, using three DMDs. DLP refers to digital light processing. DMD refers to digital micromirror device.

In the projector 2, it is desirable to cast lights of three colors separately with respect to all the projector pixels, as described above. However, when a pixel group formed of a plurality of projector pixels can be regarded as one projector pixel, the single light modulation element 22 may be employed. In this case, measurement can be performed though the resulting measurement accuracy for three-dimensional shape is lower.

1.2.2. Image Pickup Step

In the image pickup step S104, the camera 3 picks up an image of the first grid pattern 51 and the second grid pattern 52 projected on the object 9. A first picked-up image and a second picked-up image acquired by the image pickup are transmitted from the camera 3 to the computing unit 42.

The camera 3 is a three-color camera having the function of acquiring the first picked-up image and the second picked-up image separately and simultaneously, as described above. Therefore, even when the first grid pattern 51 and the second grid pattern 52 are simultaneously projected, image data of these grid patterns that are separated from each other can be acquired. Thus, based on each of the first picked-up image and the second picked-up image, a phase analysis can be performed in the step described below.

For such reasons, the camera 3 (three-color camera) may preferably have the three-panel image pickup element 31. The three-panel image pickup element 31 corresponds to each of the first light, the second light, and the third light. Therefore, a luminance value can be acquired separately for the first light, the second light, and the third light and with high position accuracy at all the image pickup pixels.

A specific example of the three-panel image pickup element 31 may be, a 3CMOS system, a 3CCD system, a vertical color separation system or the like. The 3CMOS system uses three CMOS sensors. CMOS refers to complementary metal oxide semiconductor. The 3CCD system uses three CCD sensors. CCD refers to charge-coupled device.

The vertical color separation system uses an image pickup element having three light receiving layers stacked on each other. A specific example is Foveon (trademark registered).

In the camera 3, it is desirable to acquire a luminance value separately for each of lights of three colors at all the camera pixels, as described above. However, when a pixel group formed of a plurality of camera pixels can be regarded as one camera pixel, the single image pickup element 31 may be employed. In this case, measurement can be performed though the resulting measurement accuracy for three-dimensional shape is lower.

Meanwhile, in this embodiment, before the foregoing projection step S102, steps similar to the projection step S102 and the image pickup step S104 are performed on the reference surface 91 where the object 9 is not arranged. In this way, a picked-up image of the reference surface 91 is transmitted to the computing unit 42 and the picked-up image or the result of computation is stored in the storage unit 43.

1.2.3. Computation Step

The computation step S106 further includes a phase analysis step S107, a data selection step S108, and a shape calculation step S109.

1.2.3.1. Phase Analysis Step

In the phase analysis step S107, first, the computing unit 42 performs a phase analysis on the picked-up image. In this embodiment, the computing unit 42 performs the phase analysis, using a known one-pitch phase analysis (OPPA) method.

Specifically, first, a luminance value corresponding to one cycle of the grid pattern is extracted from each of the first picked-up image, which is a picked-up image of the first grid pattern 51, and the second picked-up image, which is a picked-up image of the second grid pattern 52.

In FIG. 5, as an example, attention is focused on eight successive pixels along the x-axis including the origin on the x-axis and the y-axis. These eight pixels are referred to as "one-pitch grid OP1". This one-pitch grid OP1 is equivalent to the foregoing range corresponding to one cycle with respect to the first grid pattern 51.

In FIG. 6, as an example, attention is focused on eight successive pixels along the y-axis including the origin on the x-axis and the y-axis. These eight pixels are referred to as "one-pitch grid OP2". This one-pitch grid OP2 is equivalent to the foregoing range corresponding to one cycle with respect to the second grid pattern 52.

In the one-pitch phase analysis method, a phase analysis is performed sequentially while the set of luminance value data acquired at each camera pixel 30 in the one-pitch grid OP1 is shifted by one camera pixel each time along the x-axis. When all the shifting along the x-axis is finished, a phase analysis is then performed sequentially while the set of luminance value data acquired at each camera pixel 30 in the one-pitch grid OP1 is shifted by one camera pixel each time along the y-axis.

Also, a phase analysis is performed sequentially while the set of luminance value data acquired at each camera pixel 30 in the one-pitch grid OP2 is shifted by one camera pixel each time along the y-axis. When all the shifting along the y-axis is finished, a phase analysis is then performed sequentially while the set of luminance value data acquired at each camera pixel 30 in the one-pitch grid OP2 is shifted by one camera pixel each time along the x-axis.

The order of these processes is not limited to the above and may be changed. In this way, phase information can be acquired at all the camera pixels 30.

First phase information acquired by the phase analysis of the one-pitch grid OP1 is stored in the storage unit 43 of the control device 4, in the state of corresponding to the coordinates of one representative camera pixel in the one-pitch grid OP1. Similarly, second phase information acquired by the phase analysis of the one-pitch grid OP2 is stored in the storage unit 43 of the control device 4, in the state of corresponding to the coordinates of one representative camera pixel in the one-pitch grid OP2.

In this embodiment, the first grid pattern 51 and the second grid pattern 52 orthogonal thereto are both used. Its significance will now be described.

Figure 8:
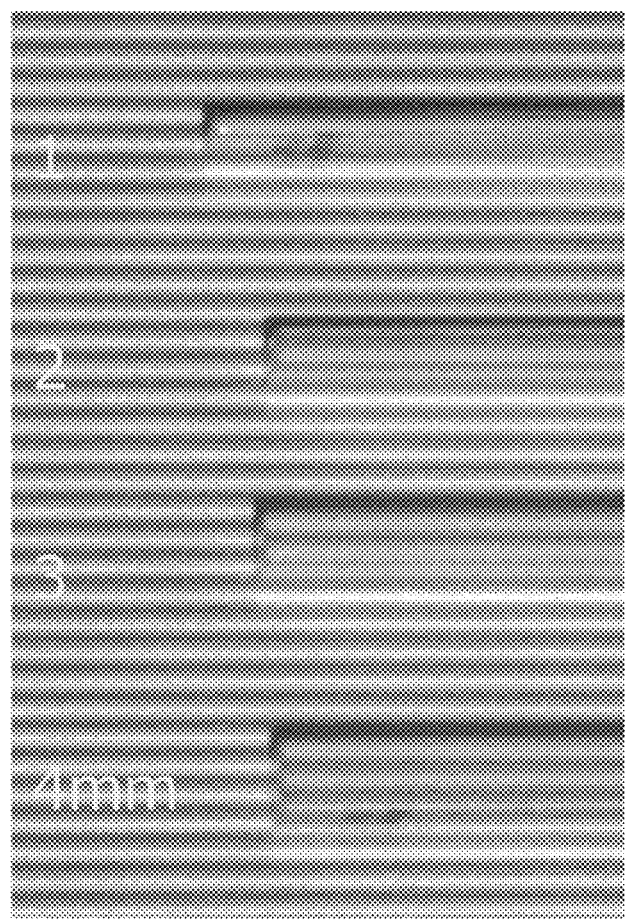
FIG. 8 shows an example of a picked-up image acquired when only a grid pattern in one direction is projected onto four rod-like elements placed on a plane.
Figure 9:
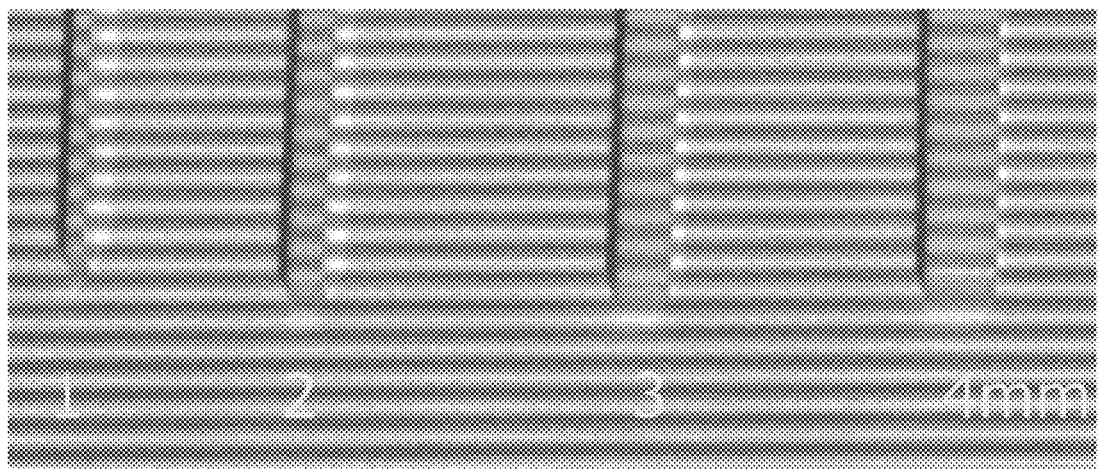
FIG. 9 shows an example of a picked-up image acquired when only a grid pattern in one direction is projected onto four rod-like elements placed on a plane.

FIGS. 8 and 9 show an example of a picked-up image acquired when only a grid pattern in one direction is projected onto four rod-like elements placed on a plane. The direction of the rod-like elements differs between FIGS. 8 and 9 by approximately 90 degrees. Therefore, in FIG. 8, the direction of the grid pattern and the longitudinal direction of the rod-like elements are substantially parallel to each other. On the other hand, in FIG. 9, the direction of the grid pattern and the longitudinal direction of the rod-like elements are substantially perpendicular to each other. As shown in FIGS. 8 and 9, the four rod-like elements have widths of 1 mm, 2 mm, 3 mm, and 4 mm. The pitch of the grid pattern is 1.7 mm.

Figure 10:
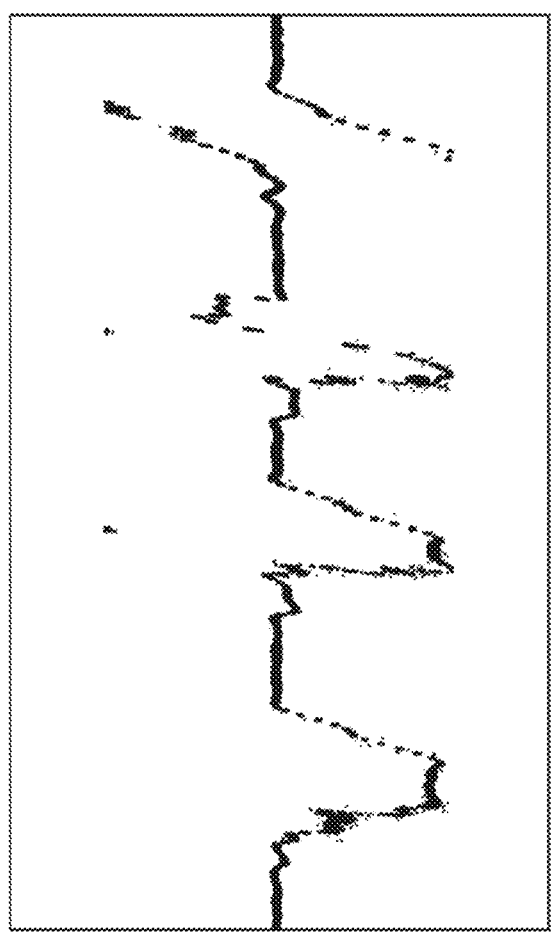
FIG. 10 is a graph prepared by slicing out a part of a distribution of height information found from the picked-up image shown in FIG. 8.
Figure 11:
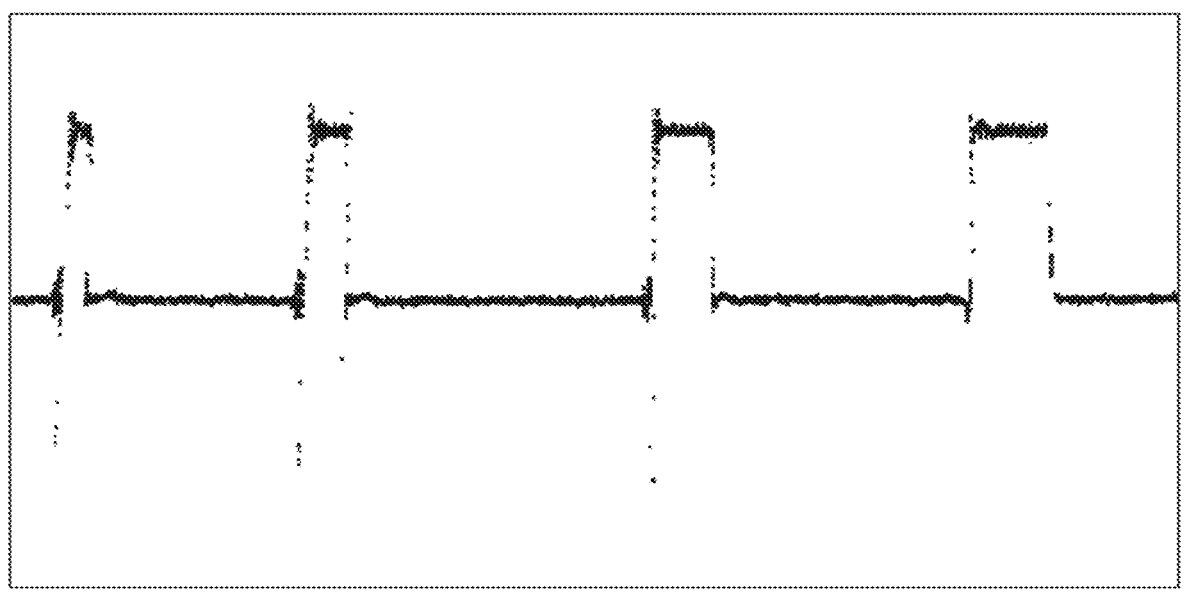
FIG. 11 is a graph prepared by slicing out a part of a distribution of height information found from the picked-up image shown in FIG. 9.

FIGS. 10 and 11 are graphs prepared by slicing out a part of a distribution of height information found from the picked-up images shown in FIGS. 8 and 9.

From the comparison between FIGS. 10 and 11, it can be seen that, in FIG. 10, the shape of steps representing change in the height information is blunt and therefore the measurement resolution for a position within the plane of the rod-like elements is low. In FIG. 10, theoretically, the length of one cycle of the first grid pattern 51 is the measurement resolution.

On the other hand, in FIG. 11, it can be seen that the shape of steps representing change in the height information is distinct and therefore the measurement resolution for a position within the plane of the rod-like elements is sufficiently high. In FIG. 11, theoretically, the size of a camera pixel is the measurement resolution.

Based on these observations, it can be understood that the relationship between the shape of the object 9 and the direction of the grid pattern influences the measurement resolution.

Therefore, in this embodiment, luminance value data is acquired from both the first picked-up image and the second picked-up image, at each camera pixel. This enables data selection in which one of the picked-up images is selected for each camera pixel and a phase analysis is performed thereon. As a result, the three-dimensional shape of the object surface 92 can be measured with high accuracy regardless of the shape of the object 9.

1.2.3.2. Data Selection Step

In the data selection step S108, the computing unit 42 compares the luminance value data of the first picked-up image with the luminance value data of the second picked-up image with respect to each camera pixel. The computing unit 42 then prepares a map for selecting the luminance value data having higher reliability. Based on the prepared map, the computing unit 42 calculates height information, using the selected picked-up image in a step described below. As such selection of luminance value data is performed for each camera pixel, a highly reliable measurement result can be ultimately acquired.

The selection criterion in the above selection is the ability to ultimately calculate highly accurate height information, that is, the reliability of the luminance value data. In this embodiment, as an example of evaluating whether the reliability is good or not, the correlativity between a luminance value data set acquired at each camera pixel in the one-pitch grid OP1 and a sine wave generated by calculation with the phase shifted in the cycle of the first grid pattern 51, and the correlativity between a luminance value data set acquired at each camera pixel in the one-pitch grid OP2 and a sine wave generated by calculation with the phase shifted in the cycle of the second grid pattern 52, may be employed. The correlativity serves as an indicator for evaluating how similar the distribution represented by the luminance value data set to the sine wave representing the luminance distribution in the first grid pattern 51.

Therefore, in this step, first, a task of comparing the correlativity between the luminance value data set of the one-pitch grid OP1 and the sine wave, with the correlativity between the luminance value set of the one-pitch grid OP2 and the sine wave, is performed. Subsequently, a data selection map is prepared, based on the result of the comparison.

A more specific procedure for finding the correlativity will now be described.

Figure 12:
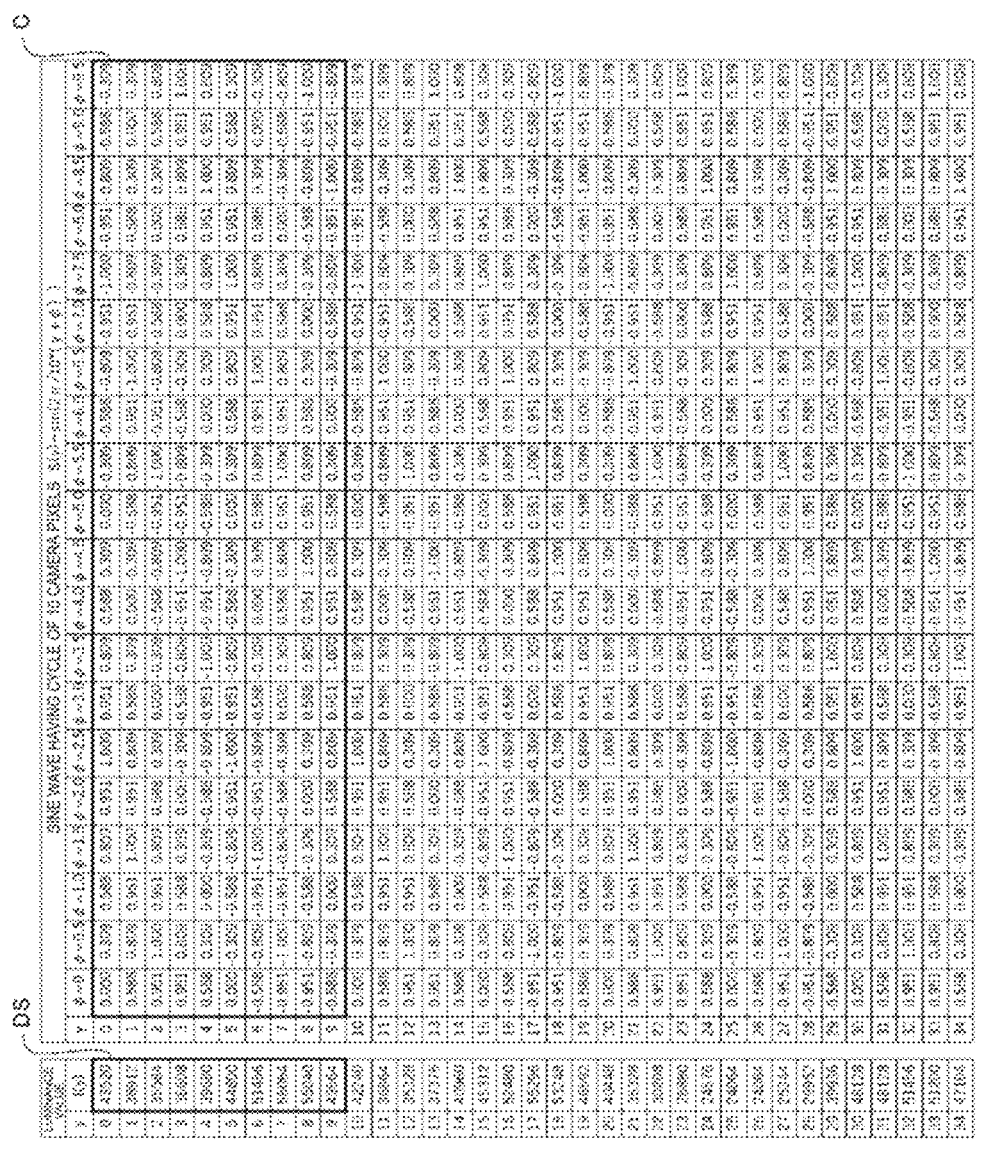

FIG. 12 explains a procedure for finding the correlativity between a luminance value data set acquired from a one-pitch grid and a plurality of sine waves generated with the phase shifted.

In FIG. 12, luminance value data of 35 successive camera pixels in the y-axis direction is shown as an example. Of these, ten camera pixels from y=0 to y=9 are defined as the one-pitch grid OP1. The luminance value data corresponding to the one-pitch grid OP1 is defined as a luminance value data set DS. Therefore, in the example shown in FIG. 12, one cycle of the grid pattern has a length of ten camera pixels.

Meanwhile, in FIG. 12, a sine wave having a cycle corresponding to the length of ten camera pixels is generated by calculation, and an amplitude value for each camera coordinate is described. The sine wave is expressed by $S(y)=\sin[2\pi/10(y+\phi)]$, as shown in FIG. 12. In this case, $S(y)$ is the amplitude value and $\phi$ is the phase of the sine wave. Changing the phase, for example, every 0.5 camera pixels, enables generation of a plurality of sine waves having different phases. In FIG. 12, the amplitude values $S(y)$ of a plurality of sine waves generated by changing the phase every 0.5 camera pixels from $\phi=0$ to $\phi=9.5$ are shown, as an example. The interval at which the phase is changed is not particularly limited and may be one camera pixel or less, or 0.5 camera pixels or less.

Next, the correlativities between the luminance value data set DS and the plurality of sine waves are found and compared. In FIG. 12, of the plurality of sine waves, a range of sine waves to be compared with the luminance value data set DS are defined as "comparison target C". To find the correlativity, the correlation coefficient between the luminance value data set DS and each sine wave included in the comparison target C is calculated. In this embodiment, the sine wave is used as a reference wave for calculating the correlation coefficient. However, another wave having the same cycle may be used instead of the sine wave.

FIG. 13 is a table showing the absolute values of the correlation coefficients between the luminance value data set DS for each camera pixel and the plurality of sine waves, calculated from the table shown in FIG. 12, and a maximum value thereof.

The absolute values of the correlation coefficients between the luminance value data set DS for each camera pixel and the plurality of sine waves, calculated by the foregoing procedure, and the maximum value thereof, are shown in the row of y=0 in the table shown in FIG. 13.

After numeric values are entered for y=0, the luminance value data set DS and the comparison target C shown in FIG. 12 are then shifted by one to the positive side along the y-axis. Then, the absolute values of the correlation coefficients and the maximum value thereof are calculated again and the result of the calculation is shown in the row of y=1 in the table shown in FIG. 13.

This task is repeated up to the row of y=25 shown in FIG. 13. The table shown in FIG. 13 is thus prepared. The sine waves with $\phi=5.0$ to 9.5 shown in FIG. 12 are inverted versions of the sine waves with $\phi=0$ to 4.5. Based on this, the correlation coefficients between the luminance value data set DS and the sine waves with $\phi=5.0$ to 9.5 are omitted from FIG. 13. In the description below, the absolute value of the correlation coefficient is simply referred to as correlation coefficient.

The maximum value calculated in this way is employed as the correlation coefficient at each camera pixel.

Similarly, the coefficient correlations and the maximum value thereof are calculated for the one-pitch grid OP2.

By the procedure as described above, the maximum value of the correlation coefficients calculated from the one-pitch grid OP1 and the maximum value of the correlation coefficients calculated from the one-pitch grid OP2 can be calculated for each camera pixel.

Therefore, in this step, the maximum value of the correlation coefficients calculated from the one-pitch grid OP1 and the maximum value of the correlation coefficients calculated from the one-pitch grid OP2 are compared with each other for each camera pixel. Then, the higher maximum value is stored in the storage unit 43. That is, in the storage unit 43, a "selected item" representing which of the foregoing first phase information and the second phase information should be used to acquire ultimate height information is stored in the state of being associated with the coordinates of each camera pixel.

When a threshold (reference value) is provided in advance and the maximum value of the correlation coefficients calculated from the one-pitch grid OP1 and the maximum value of the correlation coefficients calculated from the one-pitch grid OP2 are both lower than the threshold, ultimate height information may be not outputted for the corresponding camera pixel. In this case, neither the first phase information nor the second phase information is designated as the "selected item" stored in the storage unit 43. This means that no height information exists for that camera pixel. However, eliminating in advance the height information having a large margin of error improves the usability of three-dimensional shape data and is therefore more advantageous than including the height information having a large margin of error.

In FIG. 13, the threshold of the maximum value of the correlation coefficient is set to 0.95 as an example. The cells where the maximum value of the correlation coefficient is less than 0.95 are dotted. Particularly, the cells where the maximum value of the correlation coefficient is less than 0.90 are dotted relatively densely. As an example, the information about the camera pixels corresponding to these cells can be targets of exclusion.

Meanwhile, when the maximum value of the correlation coefficients calculated from the one-pitch grid OP1 and the maximum value of the correlation coefficients calculated from the one-pitch grid OP2 are both equal to or higher than the threshold, the computing unit 42 stores both of these maximum values in the storage unit 43. In this case, both the first phase information and the second phase information are designated as the "selected item" stored in the storage unit 43.

In this way, the coordinates of each camera pixel and the information of the "selected item" are associated with each other and stored as the "data selection map" in the storage unit 43.

1.2.3.3. Shape Calculation Step

In the shape calculation step S109, the computing unit 42 compares the first phase information about the object surface 92 with the first phase information about the reference surface 91 and finds a phase difference. Based on this phase difference, the computing unit 42 calculates first height information from the reference surface 91 to the object surface 92.

Similarly, the computing unit 42 compares the second phase information about the object surface 92 with the second phase information about the reference surface 91 and finds a phase difference. Based on this phase difference, the computing unit 42 calculates second height information from the reference surface 91 to the object surface 92.

Subsequently, based on the selected item designated in the foregoing data selection map, one or two of the first height information and the second height information are selected for each camera pixel. Ultimate height information for output is thus acquired. When both the first height information and the second height information are selected, for example, an intermediate value of the two pieces of height information may be calculated and this intermediate value may be used as the ultimate height information for output.

The timing of applying the data selection map is not limited to the foregoing timing. For example, this timing may be the timing before the first phase information and the second phase information are calculated, the timing when the phase difference is calculated, or the timing when the height information is calculated.

The three-dimensional shape of the object surface 92 is found in this way.

The three-dimensional shape measuring method according to this embodiment has been described. The color of the first light and the color of the second light used in this method are suitably selected according to the color of the object 9. For example, before the above three-dimensional shape measuring method is performed, the three-dimensional shape of an object whose shape is known is measured in advance with the color of light sequentially changed to RGB. Then, the color resulting in the highest measurement accuracy may be used as the color of light suitable for the object color.

As the first light or the second light, lights of two colors may be used. For example, red light and green light may be used as the first light, and blue light may be used as the second light. In this case, a first picked-up image based on the red light, a first picked-up image based on the green light, and a second picked-up image based on the blue light are acquired. A phase analysis is performed, selecting one of the two first picked-up images and the second picked-up image. Thus, the three-dimensional shape of the object surface 92 can be measured with higher accuracy. Also, selecting data based on the correlativity between the two first picked-up images can further increase the measurement accuracy.

The way of allocating RGB to the first light and the second light is not particularly limited. In an example, a combination in which red light is used as the first light while blue light is used as the second light and in which green light is not used may be employed. Also, a combination in which red light is used as the first light and in which blue light and green light are used as the second light may be employed.

As described above, the three-dimensional shape measuring method according to this embodiment includes the projection step S102, the image pickup step S104, and the computation step S106. In the projection step S102, the first grid pattern 51 based on the first light and the second grid pattern 52 based on the second light are projected onto the object 9 (target object) in such a way that these grid patterns intersect each other, with the first light and the second light being lights of two colors included in the three primary colors of light. In the image pickup step S104, the camera 3 (three-color camera) picks up an image of the first grid pattern 51 and the second grid pattern 52 projected on the object 9 and thus acquires the first picked-up image based on the first light and the second picked-up image based on the second light. In the image pickup step S106, a phase analysis of the grid image is performed with respect to at least one of the first picked-up image and the second picked-up image, and the height information of the object 9 is thus calculated.

In such a configuration, the phase analysis of each grid image is performed, using the first grid pattern 51 and the second grid pattern 52 intersecting each other. Therefore, the three-dimensional shape of the object 9 can be measured at high speed regardless of the shape of the object 9. Thus, the three-dimensional shape can be measured with high accuracy, for example, even when the object 9 is moving.

In the computation step S106, first, the correlativity between the luminance value in the first picked-up image and the first grid pattern 51 and the correlativity between the luminance value in the second picked-up image and the second grid pattern 52 are calculated with respect to the same pixel. Next, the two correlativities, thus calculated, are compared with each other. Then, a phase analysis is performed, using the picked-up image having the higher correlativity.

In such a configuration, a phase analysis can be performed on a picked-up image having high reliability. Therefore, the three-dimensional shape can be measured with higher accuracy. Specifically, for example, selection is made in such a way as not to use for the phase analysis a picked-up image from which luminance value data corresponding to one cycle of the grid pattern, which is necessary for the phase analysis of the grid image, cannot be acquired. Therefore, a result of measurement from which abnormal height information is eliminated can be acquired. Such a result of measurement is advantageous in that it contains few abnormal values and is therefore easier to use.

As described above, the three-dimensional shape measuring device 1 according to this embodiment has the projector 2, the camera 3 (three-color camera), and the computing unit 42. The projector 2 projects the first grid pattern 51 based on the first light and the second grid pattern 52 based on the second light onto the object 9 (target object) in such a way that these grid patterns intersect each other. The camera 3 picks up an image of the first grid pattern 51 and the second grid pattern 52 projected on the object 9 and thus acquires the first picked-up image based on the first light and the second picked-up image based on the second light. The computing unit 42 performs a phase analysis of the grid image with respect to at least one of the first picked-up image and the second picked-up image, and thus acquires the height information of the object 9.

Such a configuration enables the three-dimensional shape measuring device 1 to perform the phase analysis of each grid image, using the first grid pattern 51 and the second grid pattern 52 intersecting each other, and therefore to measure the three-dimensional shape of the object 9 at high speed regardless of the shape of the object 9. The three-dimensional shape measuring device 1 can also measure the three-dimensional shape with high accuracy, for example, even when the object 9 is moving.

2. Second Embodiment

A three-dimensional shape measuring method according to a second embodiment will now be described.

Figure 14:
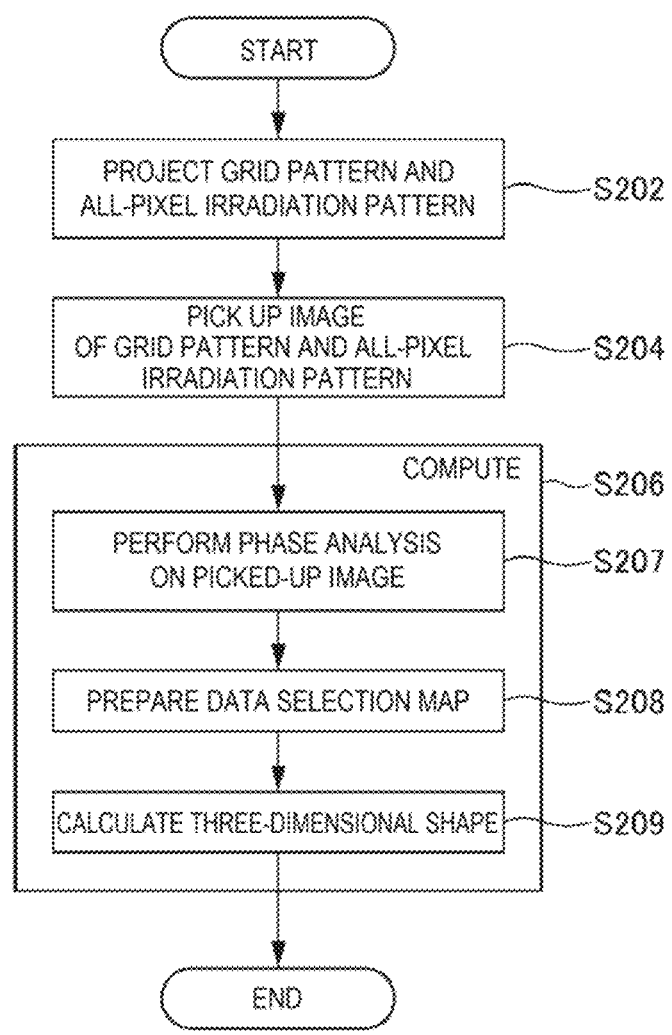
FIG. 14 is a flowchart for explaining a three-dimensional shape measuring method according to a second embodiment.
Figure 15:
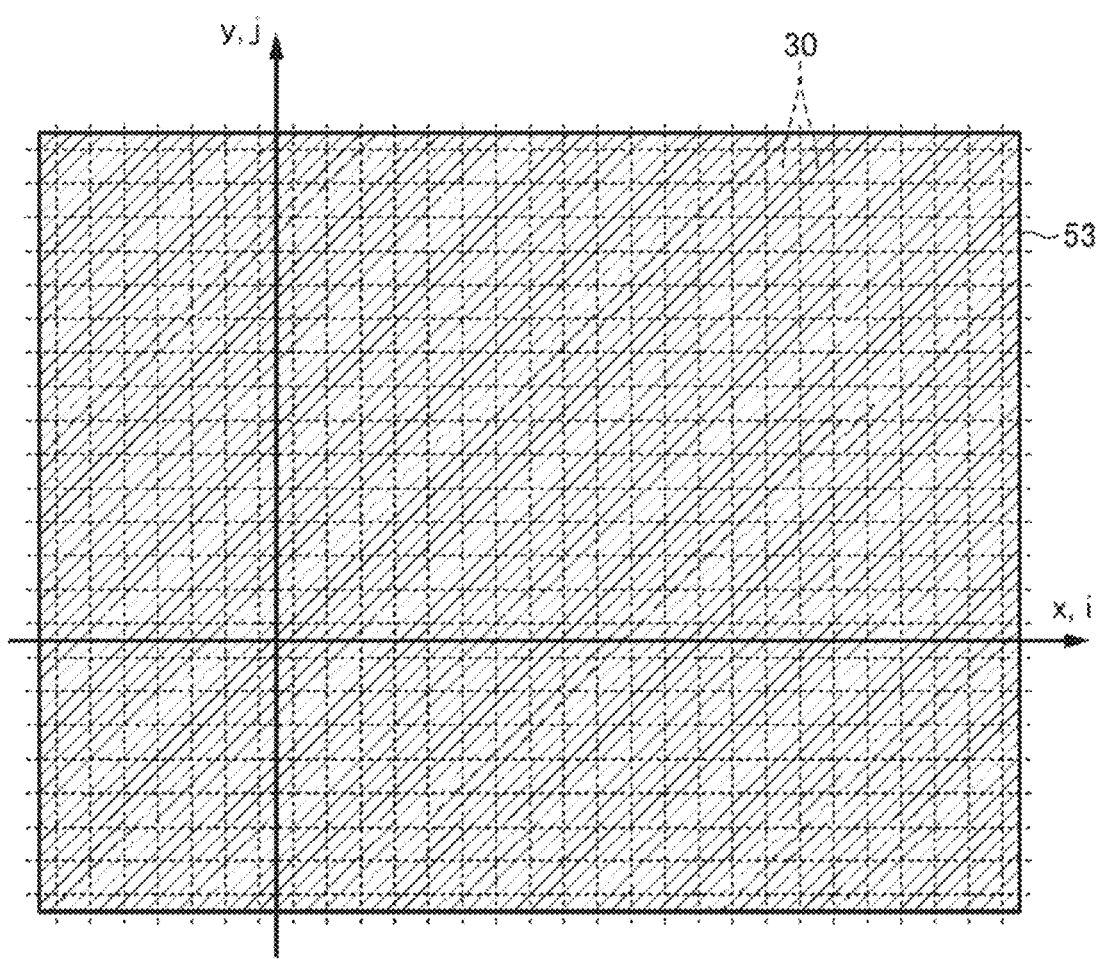
FIG. 15 shows a picked-up image acquired by picking up, by the camera, an image of a first grid pattern, a second grid pattern, and an all-pixel irradiation pattern projected by the projector, and separating a third light component.

FIG. 14 is a flowchart for explaining the three-dimensional shape measuring method according to the second embodiment. FIG. 15 shows a picked-up image acquired by picking up, by the camera 3, an image of the first grid pattern 51, the second grid pattern 52, and an all-pixel irradiation pattern 53 projected by the projector 2, and separating a third light component.

The second embodiment is described below. In the description below, the difference from the first embodiment is mainly described and the description of similar matters is omitted. In FIGS. 14 and 15, components similar to those in the first embodiment are denoted by the same reference signs.

The second embodiment is similar to the first embodiment, except for using a third light having a different projection pattern in addition to the first light and the second light.

The three-dimensional shape measuring method according to this embodiment includes a projection step S202, an image pickup step S204, and a computation step S206. The computation step S206 includes a phase analysis step S207, a data selection step S208, and a shape calculation step S209.

In the projection step S202, as in the projection step S102 according to the first embodiment, the first grid pattern 51 and the second grid pattern 52 are projected onto the object 9. In addition to this, in the projection step S202, the third light is cast in such a way as to cover at least the object 9, and the all-pixel irradiation pattern 53 shown in FIG. 15 is thus projected. At this time, the luminance distribution in the all-pixel irradiation pattern 53 may preferably be adjusted in advance in such a way that the luminance value at each camera pixel 30 is constant.

The first light, the second light, and the third light are lights of the three primary colors of light. Even when these lights are cast as superimposed on each other, the camera 3 can acquire picked-up images of these lights that are separated from each other. Therefore, the first grid pattern 51, the second grid pattern 52, and the all-pixel irradiation pattern 53 can be simultaneously projected.

Next, in the image pickup step S204, the camera 3 picks up an image of the all-pixel irradiation pattern 53 projected on the object 9 in addition to the first grid pattern 51 and the second grid pattern 52 projected on the object 9.

The camera 3 has the function of acquiring a first picked-up image based on the first light, a second picked-up image based on the second light, and a third picked-up image based on the third light, separately from each other.

Next, in the phase analysis step S207 included in the computation step S206, a phase analysis is performed, as in the phase analysis step S107 according to the first embodiment.

Next, in the data selection step S208, a data selection map is prepared, as in the data selection step S108 according to the first embodiment. In this embodiment, based on the third picked-up image, information about whether or not to ultimately output height information at each camera pixel 30 is prepared and added to the data selection map.

Specifically, in the data selection map prepared in the first embodiment, the "selected item" is designated, as described above. In the second embodiment, "whether or not to output" to determine whether or not to output ultimate height information is provided in addition to the "selected item". This "whether or not to output" is information designating whether or not to output height information at each camera pixel in the first place. In the data selection step S208, this information is prepared based on the third picked-up image.

The third picked-up image is an image picked up in the state where the third light is emitted at projector pixels corresponding to all the camera pixels where the object 9 appears.

Therefore, for example, when the object surface 92 includes an area (shaded area) that is not irradiated with the third light as the third light is blocked by, for example, the object 9 itself, this area is observed as having an extremely low luminance value. Therefore, if an extremely low luminance value can be detected, a camera pixel corresponding to the shaded area can be specified based on the extremely low luminance value.

Also, for example, when the object surface 92 includes an area (reflection area) reflecting the cast third light toward the camera 3, this area is observed as having an extremely high luminance value. Such a luminance value tends to be observed, for example, when the object surface 92 includes a glossy area or the like. When reflection occurs, the luminance value is saturated and a correct luminance value may not be acquired. Therefore, if an extremely high luminance value can be detected, a camera pixel corresponding to the reflection area can be specified based on the extremely high luminance value.

Therefore, in the data selection step S208, whether the luminance value in the third picked-up image is within a predetermined range or not, is determined. When the luminance value is lower than the predetermined range or higher than the predetermined range, the information about whether or not to output is added to the data selection map so as not to output height information at the corresponding camera pixel, in the shape calculation step S209 described later. This can prevent the output of the height information having a large margin of error due to the extremely high luminance value or the extremely low luminance value. As described above, eliminating in advance the height information having a large margin of error improves the usability of three-dimensional shape data and is therefore more advantageous than including such height information.

When performing a phase analysis based on the luminance distribution at one grid pitch in one picked-up image, a highly reliable luminance value needs to be provided in one cycle of the grid pattern. In view of this, the accuracy of the phase analysis may drop around the camera pixel corresponding to the shaded area or the reflection area. To cope with this, in the data selection step S208, the information about whether or not to output may be added to the data selection map so as to prevent the output of the ultimate height information, not only at the camera pixel corresponding to the shaded area or the reflection area but also at peripheral camera pixels pixel in a range corresponding to at least one cycle of the grid pattern. This can also prevent the output of the height information at the peripheral camera pixels that are indirectly affected by the shaded area or the reflection area.

Next, in the shape calculation step S209, the three-dimensional shape is calculated, as in the shape calculation step S109 according to the first embodiment.

The second embodiment, as described above, can achieve effects similar to those of the first embodiment.

The way of allocating RGB to the first light, the second light, and the third light is not particularly limited in this embodiment, either. For example, a combination in which red light is used as the first light while green light is used as the second light and in which blue light is used as the third light may be employed.

In this embodiment, as described above, in the projection step S202, the all-pixel irradiation pattern 53 based on the third light in addition to the first grid pattern 51 and the second grid pattern 52 is projected onto the object 9 (target object), with the third light being the light other than the first light and the second light, of the lights of three colors included in the three primary colors of light. In the image pickup step S204, the camera 3 picks up an image of the all-pixel irradiation pattern 53 projected on the object 9 and thus acquires the third picked-up image. In the computation step S206, when the luminance value in the third picked-up image is out of a predetermined range, the height information of the object 9 is not calculated.

In such a configuration, a camera pixel at which an abnormal luminance value occurs can be specified, based on the third picked-up image acquired by picking up an image of the all-pixel irradiation pattern 53. Thus, a setting can be configured in advance in such a way as not to calculate height information at this camera pixel. This can prevent the output of height information having a large margin of error and thus can prevent a drop in the accuracy of three-dimensional shape data.

The three-dimensional shape measuring method and the three-dimensional shape measuring device according to the present disclosure have been described, based on the illustrated embodiments. However, the three-dimensional shape measuring method according to the present disclosure is not limited to the embodiments. For example, a step having any objective may be added to the embodiments. The three-dimensional shape measuring device according to the present disclosure is not limited to the embodiments, either. For example, each component in the embodiments may be replaced by a component of any configuration having a similar function. Alternatively, any component may be added to the embodiments.

What is claimed is:

1. A three-dimensional shape measuring method comprising:

projecting a first grid pattern based on a first light and a second grid pattern based on a second light onto a target object in such a way that the first grid pattern and the second grid pattern intersect each other, the first light and the second light being lights of two colors included in three primary colors of light;

picking up, by a three-color camera, an image of the first grid pattern and the second grid pattern projected on the target object, and acquiring a first picked-up image based on the first light and a second picked-up image based on the second light; and performing a phase analysis of a grid image with respect to at least one of the first picked-up image and the second picked-up image and calculating height information of the target object, wherein in the projecting the first grid pattern and the second grid pattern onto the target object, an all-pixel irradiation pattern based on a third light is projected onto the target object, and the third light is different from the first light and the second light of the three primary colors, in the acquiring the first picked-up image and the second picked-up image, a third picked-up image of the all-pixel irradiation pattern projected on the target object is acquired by the three-color camera, and in the calculating the height information of the target object, the height information of the target object is not calculated when a luminance value in the third picked-up image is out of the predetermined range.

2. The three-dimensional shape measuring method according to claim 1, wherein the first grid pattern, the second grid pattern, and the all-pixel irradiation pattern are projected by a three-color separation projector.

3. The three-dimensional shape measuring method according to claim 2, wherein the three-color separation projector is a three-panel projector.

4. The three-dimensional shape measuring method according to claim 1, wherein the three-color camera has a three-panel image pickup element.

5. The three-dimensional shape measuring method according to claim 1, wherein the calculating of the height information of the target object further includes:

calculating a first correlativity between a luminance value in the first picked-up image and the first grid pattern and a second correlativity between a luminance value in the second picked-up image and the second grid pattern;

comparing between the calculated first correlativity and the calculated second correlativity; and performing the phase analysis, using one of the first picked-up image or the second picked-up image that has a higher value among the calculated first correlativity and the calculated second correlativity.

6. A three-dimensional shape measuring device comprising:

a projector projecting a first grid pattern based on a first light and a second grid pattern based on a second light onto a target object in such a way that the first grid pattern and the second grid pattern intersect each other, the first light and the second light being lights of two colors included in three primary colors of light;

a three-color camera picking up an image of the first grid pattern and the second grid pattern projected on the target object and acquiring a first picked-up image based on the first light and a second picked-up image based on the second light;

a computing unit performing a phase analysis of a grid image with respect to at least one of the first picked-up image and the second picked-up image and calculating height information of the target object a memory configured to store a program; and a processor configured to execute the program so as to:
cause the projector to project an all-pixel irradiation pattern based on a third light onto the target object, the third light being different from the first light and the second light of the three primary colors;

cause the three-color camera to pick up an image of the all-pixel irradiation pattern projected on the target object and acquire a third picked-up image based on the third light; and perform a phase analysis of a grid image with respect to at least one of the first picked-up image and the second picked-up image and calculate height information of the target object, wherein, when the processor determines that a luminance value in the third picked-up image is out of a predetermined range, the height information of the target object is not calculated.

7. The three-dimensional shape measuring device according to claim 6,
wherein the projector is a three-color separation projector to project the first grid pattern, the second grid pattern, and the all-pixel irradiation pattern.

8. The three-dimensional shape measuring device according to claim 7,
wherein the three-color separation projector is a three-panel projector.

9. The three-dimensional shape measuring device according to claim 6,
wherein the three-color camera has a three-panel image pickup element.

10. The three-dimensional shape measuring device according to claim 6,
wherein the processor is further configured to:
calculate a first correlativity between a luminance value in the first picked-up image and the first grid pattern and a second correlativity between a luminance value in the second picked-up image and the second grid pattern;

compare between the calculated first correlativity and the calculated second correlativity; and perform the phase analysis, using one of the first picked-up image or the second picked-up image that has a higher value among the calculated first correlativity and the calculated second correlativity.

* * * * *